S. GROOM.
HOSE COUPLING.
No. 12,626. Patented Apr. 3, 1855.
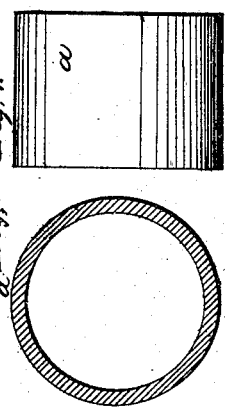
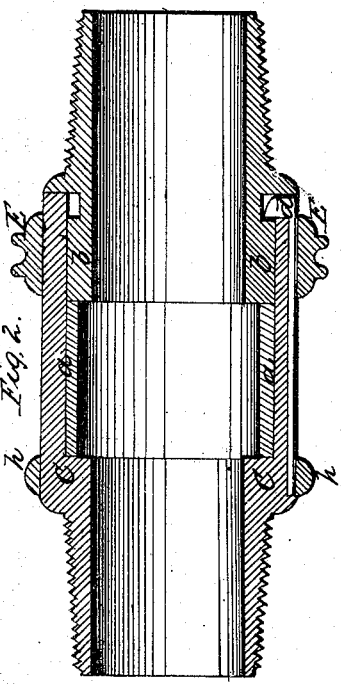
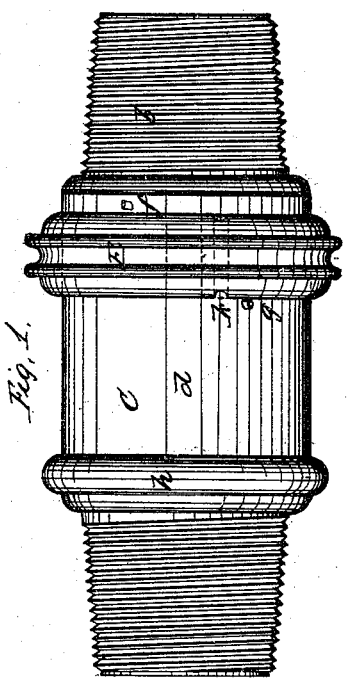
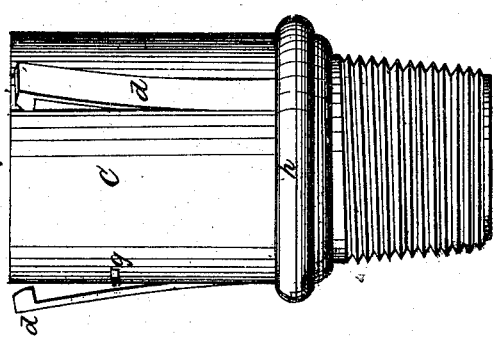
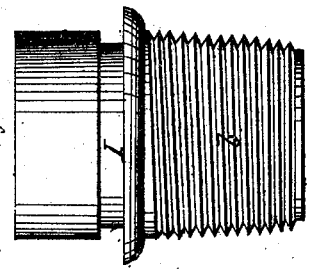
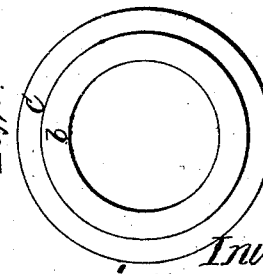
Witnesses:
Ambrose Adams
J. L. Barney
Inventor:
Smith Groom

UNITED STATES PATENT OFFICE.

SMITH GROOM, OF TROY, NEW YORK.

HOSE-COUPLING.

Specification of Letters Patent No. 12,626, dated April 3, 1855.

*To all whom it may concern:*

Be it known that I, SMITH GROOM, of Troy, in the county of Rensselaer, State of New York, have invented a new Mode for Making Coupling; and I do hereby declare that the following is a full and exact description thereof, reference being had to the accompanying drawings and to the reference-letters marked thereon.

Figure 1 is a description of the coupling in full, letter $b$ is a description of the male part. C, is the female part in which the male part $b$ enters. $d$, represents the spring clutches which secure the male and female parts together, by the action of the slide ring marked E, as represented in the drawing. $h$, is a ring which secures the clutches. K is the slot in the slide ring E.

Fig. 2 is the one half view of Fig. 1 which shows the internal arrangement; C, C, C, is the female part; $a, a,$ is the packing; $b, b,$ is the male part inserted in $c, c; d,$ is the spring clutches; E, E, is the slide ring; $h, h,$ is the ring which secures the spring clutches.

Fig. 3 is the view of the female part of Fig. 1 in which the male part $b$, enters; $h,$ is the ring which secures the clutches; $d, d,$ is the spring clutches; $g$ is the stud; the slide ring E is left off to show the action of the spring clutches.

Fig. 4, is the male part; $b$ is the part that enters the female part $c;$ I, is the groove in which the spring clutches are secured.

Fig. 5 is an end view of the coupling when together; $b$ shows the male part entering $c$.

Fig. 6, shows the male and female parts together; $d, d, d,$ are the spring clutches; $c$ is the female part where $b$, enters; $h$ is the ring which secures the clutches.

Fig. 7, letter $a$ is the side view of the packing.

Fig. 8 shows an end view of the packing.

Having thus fully described the nature of my invention what I claim therein as new and desire to secure by Letters Patent is—

A hose coupling composed of two parts—on one of which are spring clamps or jaws controlled by a friction ring, and on the other a groove into which said jaws or clamps take, the whole being so arranged when united, as to make a tight joint, and yet allow one half of the coupling to turn on the other half without uncoupling it, as set forth.

SMITH GROOM.

Witnesses:
A. ADENNS,
J. C. THOMPSON.